July 27, 1948.    H. LEHDE    2,446,015
ELECTROLYTIC CONCENTRATION INDICATOR
Filed Oct. 16, 1943
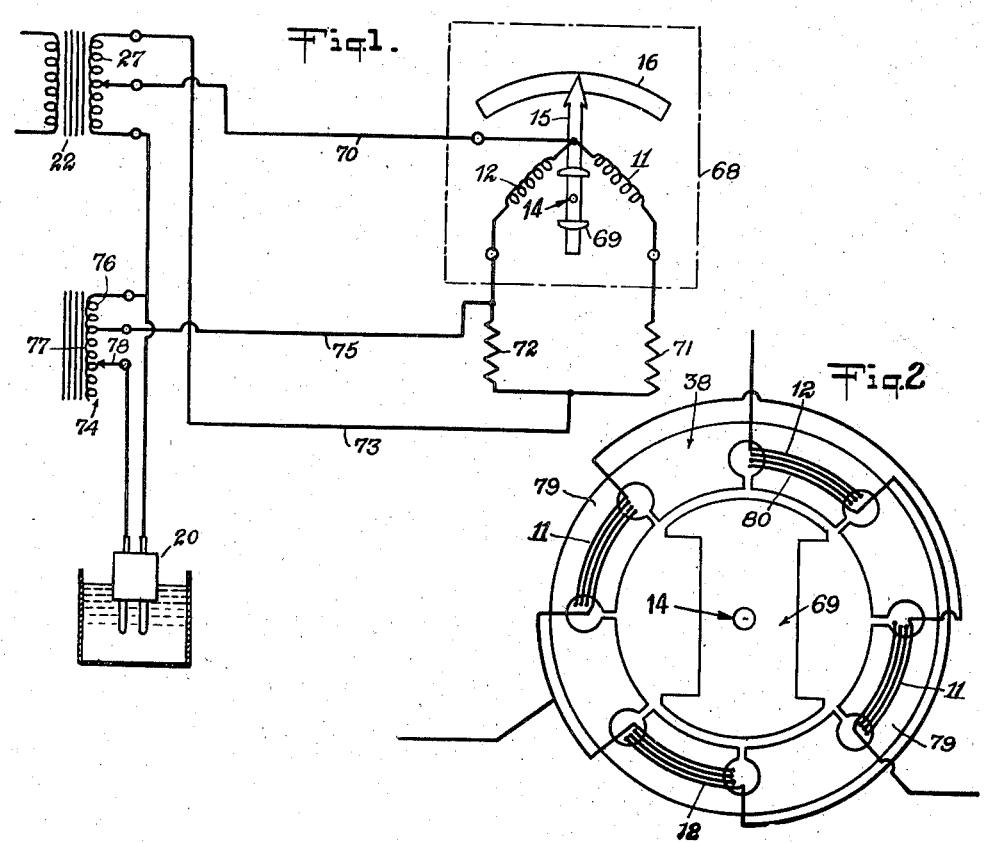
INVENTOR.
Henry Lehde
BY
Edward L Mueller
Attorney Patented July 27, 1948

2,446,015

UNITED STATES PATENT OFFICE 2,446,015

ELECTROLYTIC CONCENTRATION INDICATOR

Henry Lehde, Brooklyn, N. Y., assignor to Control Instrument Company, Inc., Brooklyn, N. Y., a corporation of New York Application October 16, 1943, Serial No. 506,578

2 Claims. (Cl. 175—183)

This invention relates to improvements in electrical indicating systems and has particular reference to an indicating means which may be employed for the measurement of unknown electrical resistances, and more especially for the determination of the concentration of an electrolyte from its electrical conductivity and temperature.

Systems of this character are commonly employed for obtaining quantitative indications of the presence of salt in marine power and distilling plants and in various other industrial processes, wherein it is desirable to detect or maintain a definite concentration in an electrolyte. Salinity cells are used in such systems and their electrical conductivity is a measure of the salt concentration at the locations of said cells and, since the resistance of an electrolyte varies with temperature, any variations of this nature in the solutions being tested are compensated for, so that a correct reading in terms of salt concentration can be obtained.

In such systems, it has been customary to utilize a measuring instrument or meter of the commonly known crossed coil type having a set of coils secured together in quadrature and freely movable in a magnetic field. With such a meter, one movable coil is energized by a constant current while the other coil or coils are responsive to current flowing through the salinity cell being tested and deflect the coil assembly to indicate the conductivity of said cell, the deflection of the assembly being dependent upon the ratio of the current in the constantly energized coil to that in the coil which includes the salinity cell. Therefore, adjustment of the current in these coils furnishes a means of varying the conductivity indications and, by proper adjustment of a resistance in the circuit in accordance with cell temperature, the conductivity readings on the meter may be converted into readings of salt concentration. Such moving coil systems, although producing satisfactory results, are open to the objections that the movable assembly is complex in structure and difficult to manufacture, requires a number of flexible connections for the moving parts, is too fragile to withstand shock, and the torque exerted by the movable assembly is usually sufficient only to operate an indicator.

In accordance with the present invention, some of the above objectionable features are overcome by the provision of an improved and simplified construction of measuring instrument and control therefor in which the number of flexible connections required is eliminated through the medium of a fixed crossed coil assembly so as to minimize the disturbing torque of such connections and thereby improve the accuracy of the meter and wherein the value of the scale indications on the instrument may be changed in a simple manner.

Another object resides in providing a rugged type of instrument having improved accuracy and uniformity of performance together with greatly increased torque, thus permitting its use in the operation of various instrumentalities in the form of alarm, control and recording devices, and other similar equipment.

A still further object is to obtain indications of changes in the salt concentration of a solution by the use of a meter including a fixed coil system and to compensate for temperature variations by coupling a compensating transformer to the salinity cell in said solution and to a fixed coil in said system.

The above and other objects will appear more clearly from the following detailed description when taken in connection with the accompanying drawings which illustrate preferred embodiments of the inventive idea; but it is to be expressly understood that said drawings are utilized only for the purpose of describing the invention as a whole and not to define the limits thereof, reference being had to the appended claims for this purpose.

In the drawings:

Fig. 1 is a diagrammatic view of a circuit in which a compensating transformer is utilized to compensate for temperature variations at the salinity cells, and Fig. 2 is a plan view showing a coil structure adapted for use in the circuit of Fig. 1.

In the form of the invention shown in the drawing, the stationary coil system of the meter 68 comprises the two coils 11 and 12 arranged at right angles and combined to create a magnetic field in which the rotor 69 is movable so as to operate the indicator 15 over the scale 16 to indicate the amount of concentration of the electrolyte in which the cell 20 is immersed. A common conductor 70 connects the tapped secondary 27 of the transformer 22 with the two coils 11 and 12, and circuits for the latter are completed through the resistors 71 and 72, respectively, and the conductor 73 to the upper terminal of said secondary winding, thus impressing similar voltages across coils 11 and 12.

The junction of coil 12 and resistor 72 is returned through conductor 75 in series with the winding 76 of the auto-transformer 74 to the lower terminal of the secondary of transformer 22, introducing a voltage of opposite polarity to that already existing because of the aforementioned connections across coil 12. Coil 11 is relatively unaffected by the voltage so introduced because of the isolating effect of resistors 71 and 72, which are in series with respect to the voltage thus applied.

Thus the voltage across coil 11 represents the voltage across that part of the secondary of transformer 22 designated as 27; whereas the voltage across coil 12 represents the sum or difference (as the case may be) between the voltage across said secondary portion 27 and the voltage which exists between the conductors numbered 70 and 75.

The voltage across the transformer section 76 is determined by the total current in the entire auto-transformer, and the ratio of the number of turns which exists between the sections 76 and 77. This ratio is made variable by virtue of the fact that terminal 78 is made variable.

Cell 20 is connected to the variable terminal 78 of auto-transformer 74, and to the lower terminal of transformer 22, so that it is, in effect, in shunt with the whole of the utilized winding of said auto-transformer.

The current in section 76 may be made identical, for identical electrolytic concentrations of varying temperatures, by adjustment of terminal 78, thus varying the total number of utilized turns of auto-transformer, and the ratio of turns between sections 76 and 77 thereof. This adjustment may be calibrated directly in degrees of temperature and be used thereafter as a temperature compensating adjustment for the instrument.

Any change in the electrolytic concentration of the cell 20 will, for a given, constant temperature, cause a change in its resistance which shunts all of transformer 74, and thus will change the value of current flowing therein, and the voltage across section 76 thereof.

The potential of coil 12 will vary with the voltage thus produced, as some function of the conductivity of the cell 20.

Since the potential of coil 12 is the sum or difference of the voltages across coil 27 and the voltage of the remainder of transformer 22 in series with section 76 of auto-transformer 74, the magnitude and direction of the potential across coil 12 will vary with the current flowing in cell 20 as some function of its conductivity, or of its electrolytic concentration.

The rotor 69 will respond to the vector sum of the magnetic fields thus produced in the coils 11, 12, and, through this response a reading of the concentration is obtained from the indicator 15 and the scale 16. Adjustment of the compensating transformer 74 will also vary the meter indications by introducing a variable factor dependent upon the ratio of the turns in the transformer winding sections 76, 77.

In the structure of Fig. 2, the rotor 69 is a laminated core and is mounted on the shaft 14 which carries the indicator 15. Since no electrical connections are made to said rotor 69, the construction of the meter is considerably simplified. The coils 11 and 12 are wound in quadrature upon diametrically disposed sectors 79 and 80, respectively, of the laminated stator 38.

The meter above described may also be used as an ohmmeter for the measurement of resistance by substituting the unknown resistance for the electrolytic cell and keeping the compensating resistance at a fixed value. If the meter is operated on direct current, the movable field coil 13 may be replaced by a permanent magnet, thereby eliminating the flexible connections to the movable element and making the meter a very simple and inexpensive ohmmeter. It is desirable in such case to magnetically shield the movable element in order to minimize any deviation caused by the earth's magnetic field. This arrangement may also be used when operating the meter as an electrolytic concentration indicator, but it is usually more desirable to operate the latter equipment on alternating current so as to reduce polarization and deterioration of the electrodes of the salinity cells.

It will be evident from the foregoing description that the invention as a whole considerably simplifies the manufacture and assembly of electrolytic concentration indicators of the crossed coil type; since the coils, when embodied in a stationary system, can be more accurately aligned and assembled in proper position relative to each other than they can in a movable system. This results in greater uniformity and accuracy in the meter indications. Further, connections to the stationary coils can be easily modified if it becomes necessary to change the value of the scale indications of the meter, or additional coils may be provided to change the scale calibrations or to produce other compensating effects.

What is claimed is:

1. In an electrolytic concentration indicator, a conductivity cell, a stator of fixed, angularly disposed coils, a movable magnetic indicating element responsive to the combined magnetic fields produced by said coils, an energizing transformer, parallel energizing circuits of constant current connected to a portion of said energizing transformer independently of said cell, and a variable auto-transformer in shunt with said conductivity cell, and having a part of its winding in series with but one of the aforementioned coils and the remaining portion of the said energizing transformer.

2. In an electrolytic concentration indicator, a conductivity cell, a coil system of angularly disposed coils connected in series, a movable magnetic indicating element responsive to the combined magnetic fields produced by said coils, a pair of resistors, said resistors being in series with each other and in parallel with the aforesaid coils, an energizing transformer having an adjustably tapped secondary winding, an energizing circuit connecting a part of said secondary with one of said coils in series with one of said resistors, in parallel with the other of said coils in series with the other of said resistors, and a second circuit including a compensating autotransformer having fixed and variable taps and with said conductivity cell in shunt therewith, said second circuit connecting one of the aforesaid coils with the remaining portion of the secondary of said energizing transformer in series with a part of said auto-transformer.

HENRY LEHDE.

REFERENCES CITED

The following references are of record in the file of this patent:

UNITED STATES PATENTS

| Number | Name | Date |
| --- | --- | --- |
| 478,098 | Evershed | July 5, 1892 |
| 1,399,181 | Bascom | Dec. 6, 1921 |
| 1,399,200 | Edelman | Dec. 6, 1921 |
| 1,684,645 | Smith | Sept. 18, 1928 |
| 2,068,499 | Mackenzie | Jan. 19, 1937 |
| 2,150,015 | Witham | Mar. 7, 1939 |
| 2,306,691 | Ellis | Dec. 29, 1942 |

FOREIGN PATENTS

| Number | Country | Date |
| --- | --- | --- |
| 8,602 | Great Britain | Sept. 4, 1913 |
| 333,727 | Great Britain | Aug. 21, 1930 |
| 11,509 | Great Britain | Mar. 31, 1904 |